US008303155B2

(12) United States Patent
Shigeta et al.

(10) Patent No.: US 8,303,155 B2
(45) Date of Patent: Nov. 6, 2012

(54) BIFACIAL LIGHT EMITTING BACKLIGHT

(75) Inventors: Hiroaki Shigeta, Osaka (JP); Masanobu Okano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/738,533

(22) PCT Filed: Oct. 15, 2008

(86) PCT No.: PCT/JP2008/068621
§ 371 (c)(1),
(2), (4) Date: Apr. 16, 2010

(87) PCT Pub. No.: WO2009/051125
PCT Pub. Date: Apr. 23, 2009

(65) Prior Publication Data
US 2010/0214804 A1    Aug. 26, 2010

(30) Foreign Application Priority Data
Oct. 19, 2007    (JP) .................................. 2007-272104

(51) Int. Cl.
*F21V 7/04*    (2006.01)

(52) U.S. Cl. ........ 362/620; 362/612; 362/616; 362/607; 362/606; 362/97.2

(58) Field of Classification Search .................. 362/600, 362/601, 606, 607, 612, 616, 620, 97.1–97.3
See application file for complete search history.

(56) References Cited

U.S. PATENT DOCUMENTS

| 6,679,613 | B2 * | 1/2004 | Mabuchi ....................... 362/600 |
| 7,538,835 | B2 | 5/2009 | Kim |
| 7,777,833 | B2 | 8/2010 | Hwang et al. |
| 2003/0063456 | A1 * | 4/2003 | Katahira ........................ 362/27 |
| 2004/0100423 | A1 * | 5/2004 | Nagakubo et al. ............. 345/40 |
| 2005/0117369 | A1 | 6/2005 | Liu |
| 2006/0007372 | A1 * | 1/2006 | Yuuki et al. .................... 349/96 |
| 2006/0050199 | A1 * | 3/2006 | Hsu et al. ........................ 349/64 |
| 2006/0087867 | A1 * | 4/2006 | Kim ............................... 362/619 |
| 2006/0146238 | A1 * | 7/2006 | Lin et al. ....................... 349/114 |
| 2006/0243996 | A1 * | 11/2006 | Ueda et al. ..................... 257/98 |

FOREIGN PATENT DOCUMENTS

| JP | 2002-133906 A | 5/2002 |
| JP | 2003-207647 A | 7/2003 |
| JP | 2004-111353 A | 4/2004 |
| JP | 2005-166626 A | 6/2005 |
| JP | 2005-346107 A | 12/2005 |
| JP | 2007-5091 A | 1/2007 |
| JP | 2007-156119 A | 6/2007 |
| JP | 2007-233610 A | 9/2007 |

* cited by examiner

*Primary Examiner* — Danielle Allen
(74) *Attorney, Agent, or Firm* — Birch, Stewart, Kolasch & Birch, LLP

(57) ABSTRACT

A light guide plate has a main-side microprism array sheet (main-side MPA sheet) 3 adhered to the top face 2a thereof, and a sub-side microprism array sheet (sub-side MPA sheet) 4 adhered to the bottom face 2b thereof. A prism formation region of the sub-side MPA sheet 4 is smaller than that of the main-side MPA sheet 3. Prisms in the prism formation region of the main-side MPA sheet 3 are, in an arrangement where the density of prisms arranged increases with distance from a light source 5, so arranged that the density of prisms arranged increases in a region that faces the prism formation region of the sub-side MPA sheet 4.

8 Claims, 8 Drawing Sheets

Fig.4
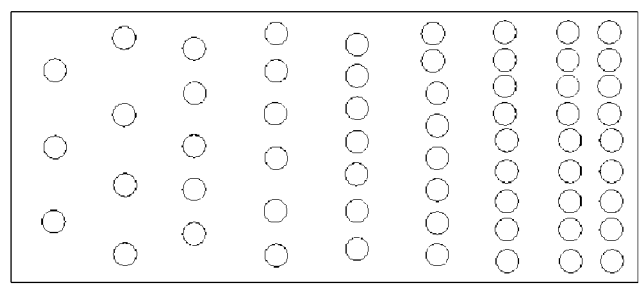
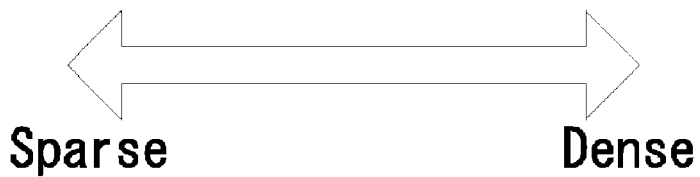

BIFACIAL LIGHT EMITTING BACKLIGHT

TECHNICAL FIELD

The present invention relates to a bifacial light emitting backlight assembled into a liquid crystal display device.

BACKGROUND ART

Among backlights that are assembled into liquid crystal display devices, there are backlights of a bifacial light emitting type, which emit light from both faces of a light guide plate. Conventional bifacial light emitting backlights are provided with a large number of optical sheets (a lens sheet, a diffusion sheet, or the like) in each of the both faces of the light guide plate. Thus, there arise problems such as difficulty in achieving a slim backlight, requiring cost for the number of optical sheets, and resulting in increased cost due to increased production processes.

Thus, Patent Document 1 discloses a bifacial light emitting backlight in which an emitted-light control plate having microstructure prism arrays formed in one face thereof is in close contact with each of both faces of a light guide plate. Such a bifacial light emitting backlight makes it possible to reduce the number of optical sheets, and thus to achieve slim backlights and to reduce cost.

Patent Document 1: JP-A-2002-133906

DISCLOSURE OF THE INVENTION

Problems to be Solved by the Invention

In the bifacial light emitting backlight disclosed in above-mentioned Patent Document 1, however, the size of a prism-array formation region of the emitted-light control plate is the same on both faces of the light guide plate (see FIG. 1 in Patent Document 1), and thus the bifacial light emitting backlight is for use with liquid crystal display devices in which the size of a display region is the same at both faces, but not for use with liquid crystal display devices in which the size of the display region is different at the both faces.

An object of the present invention is to provide a bifacial light emitting backlight that copes with liquid crystal display devices, in which the size of a display region is different at both faces of a light guide plate, while reducing the number of optical sheets, and that can offer excellent display quality in display regions at the both faces.

Means for Solving the Problem

To achieve the above object, according to the present invention, a bifacial light emitting backlight comprises: a light source comprising a base member that extends in a longitudinal direction and a plurality of LEDs that are arranged on a surface of the base member in a longitudinal direction thereof with an interval between one another; a light guide plate having light from the light source incident on an end face thereof; a first microprism array sheet which is a transparent sheet having a plurality of microstructure prisms formed in one face thereof, the first microprism array sheet being formed integral with the light guide plate with the prisms facing the light guide plate, and receiving light from the light guide plate and directing the light to a first liquid crystal panel; and a second microprism array sheet which is a transparent sheet having a plurality of microstructure prisms formed in one face thereof, the second microprism array sheet being formed integral with the light guide plate with the prisms of the second microprism array sheet facing a face of the light guide plate opposite from a face thereof on which the first microprism array sheet is provided, and receiving light from the light guide plate and directing the light to a second liquid crystal panel, wherein a prism formation region of the second microprism array sheet is smaller than a prism formation region of the first microprism array sheet, and prisms in the prism formation region of the first microprism array sheet are, in an arrangement where a density of prisms arranged increases with distance from the light source, so arranged that the density of prisms arranged increases in a region that faces the prism formation region of the second microprism array sheet.

With this structure, it is possible to cope with liquid crystal display devices, in which the size of a display region is different at both faces of a light guide plate, while reducing the number of optical sheets. Moreover, prisms in the first microprism array sheet are arranged with consideration given to light energy used by prisms of the second microprism array sheet, and thus it is possible to achieve the uniformity of brightness in a light-emitting region on the first microprism array sheet side, and to offer excellent display quality in display regions at the both faces.

In the bifacial light emitting backlight according the invention, preferably, in the structure described above, the light source comprises a resin portion so arranged as to cover the plurality of LEDs, and a surface of the resin portion on an opposite side from a base member side has, in the longitudinal direction, a concave part between adjacent ones of the LEDs in the longitudinal direction.

With this structure, the light that travels through the resin portion in the longitudinal direction thereof is taken out from the concave part as emitting light, and thus it is possible to enhance the brightness of a part between adjacent LEDs where the brightness tends to be low, and to offer excellent uniformity in the distribution of the light emission intensity in the longitudinal direction of the light source. In addition, in a light-emitting region of the backlight, unevenness in brightness in a region on the light incident part side can be suppressed.

In the bifacial light emitting backlight according to the present invention, preferably, in the structure described above, a film portion included in the second microprism array sheet has a smaller size than a face of the light guide plate, on which the second microprism array sheet is provided. This makes it possible to cut down the amount of sheet in the second microprism array sheet and to reduce the cost of the sheet.

In the bifacial light emitting backlight according to the invention, preferably, in the structure described above, the film portion included in the second microprism array sheet has the same size as the face of the light guide plate, on which the second microprism array sheet is provided. This makes it possible to easily form the second microprism array sheet integral with the light guide plate without deviation.

Advantages of the Invention

With the bifacial light emitting backlight according to the present invention, it is possible to cope with a liquid crystal display device, in which the size of a display region is different at both faces of a light guide plate, while reducing the number of optical sheets, and to offer excellent display quality in display regions at the both faces.

BRIEF DESCRIPTION OF DRAWINGS

FIG. 4 A diagram illustrating the arrangement of prisms in a main-side microprism array sheet.

Figure 1:
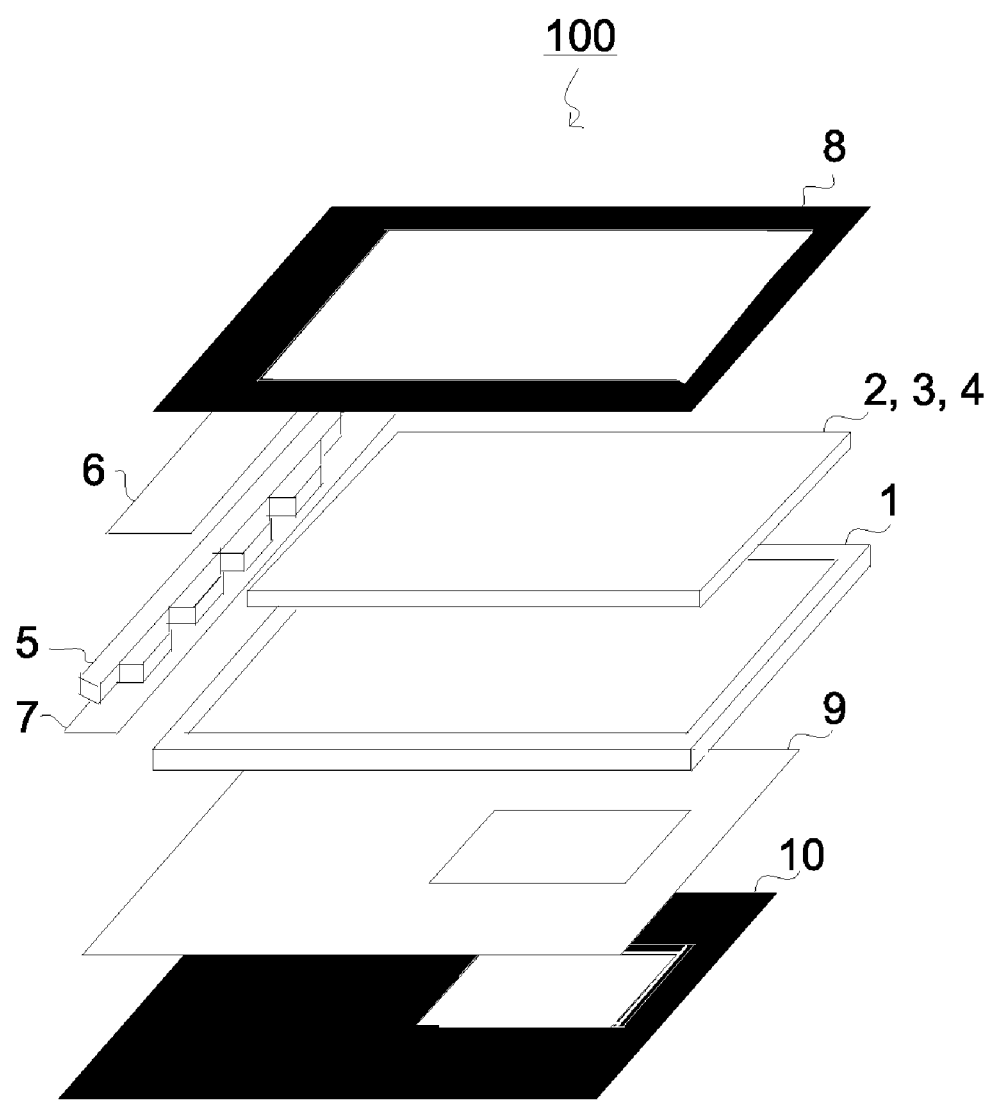
FIG. 1 An exploded perspective view of a bifacial light emitting backlight according to a first embodiment of the present invention.

LIST OF REFERENCE SYMBOLS 1 frame
2 light guide plate
2a top face
2b bottom face
2c light incident surface
3 main-side microprism array sheet
3a prism
3b film portion
3c project portion
3' main-side microprism array sheet
4 sub-side microprism array sheet
4a prism
4b film portion
4c project portion
4' sub-side microprism array sheet
5 light source
5a printed circuit board
5b LED
5c resin sealing layer
5d resin sealing layer
6 reflective sheet
7 reflective sheet
7' reflective sheet
8 light-shielding bifacial tape
8a opening
9 reflective sheet
9' reflective sheet
10 light-shielding bifacial tape
10a opening
10' light-shielding bifacial tape
10'a opening
11 sub-side microprism array sheet
11a prism
11b film portion
11c project portion
11' sub-side microprism array sheet
12 reflective sheet
13 reflective sheet
13a opening
13' reflective sheet
13'a opening

BEST MODE FOR CARRYING OUT THE INVENTION

Hereinafter, embodiments of the present invention will be described with reference to the relevant drawings.

First Embodiment

FIG. 1 is an exploded perspective view showing a bifacial light emitting backlight 100 according to a first embodiment of the invention. In FIG. 1, a light guide plate 2, a main-side microprism array sheet 3, a sub-side microprism array sheet 4 are simply shown as a single rectangular member.

Figure 2:
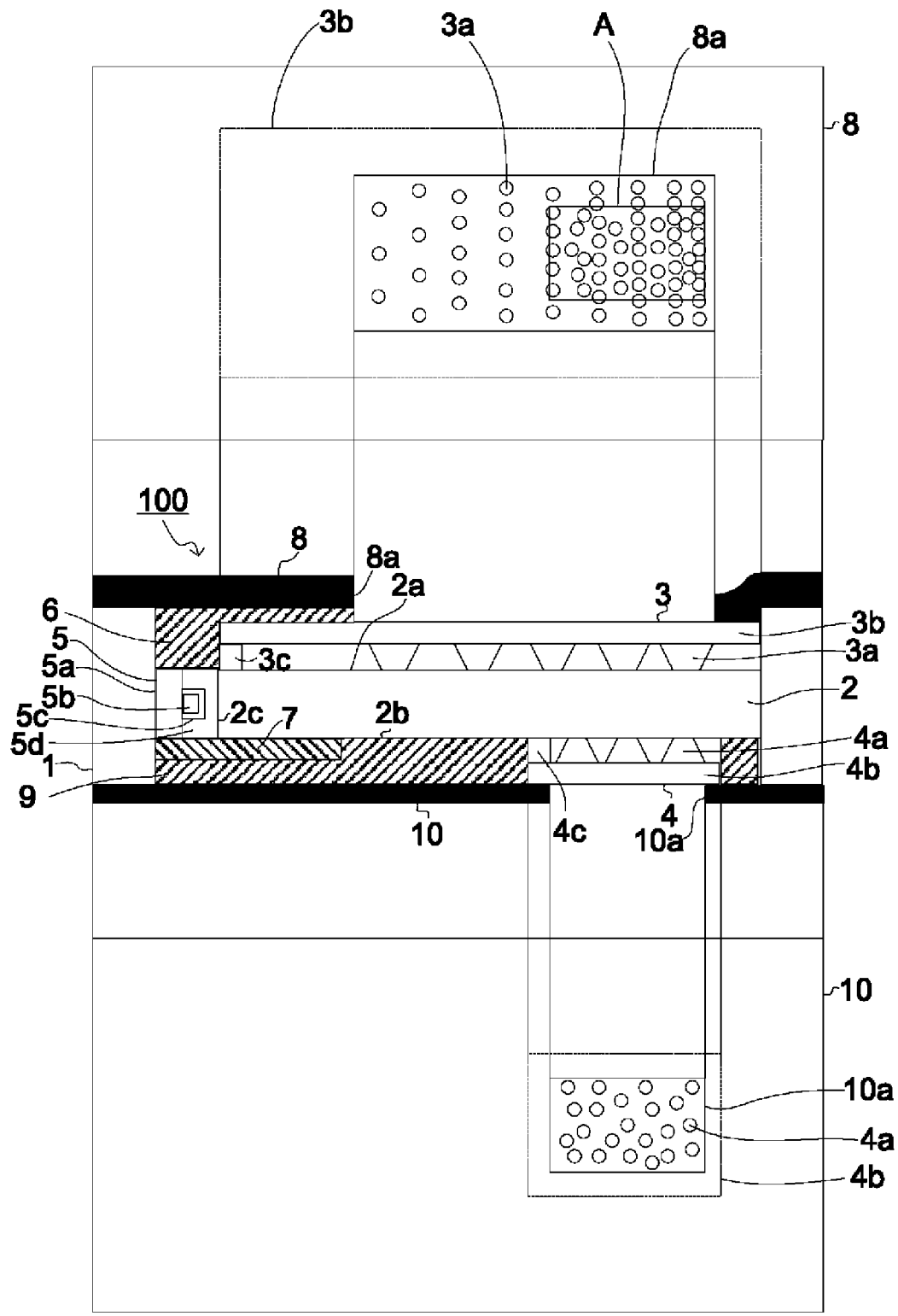
FIG. 2 A side sectional view (a middle part), a top view (an upper part), and a bottom view (a lower part) of the bifacial light emitting backlight according to the first embodiment of the invention.

FIG. 2 shows a side sectional view (a middle part), a top view (an upper part), and a bottom view (a lower part) of the bifacial light emitting backlight 100 according to the first embodiment of the invention. The top and bottom views schematically show an arrangement of prisms in a microprism array sheet.

As shown in the diagram, the bifacial light emitting backlight 100 according to the first embodiment of the invention is provided with a frame 1, a light guide plate 2, a main-side microprism array sheet (a main-side MPA sheet) 3, a sub-side microprism array sheet (a sub-side MPA sheet) 4, a light source 5, a reflective sheet 6, a reflective sheet 7, a light-shielding bifacial tape 8, a reflective sheet 9, and a light-shielding bifacial tape 10.

The frame 1 is so shaped as to surround the outer circumference of a substantially rectangular opening, and is a resin mold component. In the opening of the frame 1, the light guide plate 2, the main-side MPA sheet 3, the sub-side MPA sheet 4, the light source 5, the reflective sheet 9, the reflective sheet 6, and the reflective sheet 7 are housed.

Figure 3:
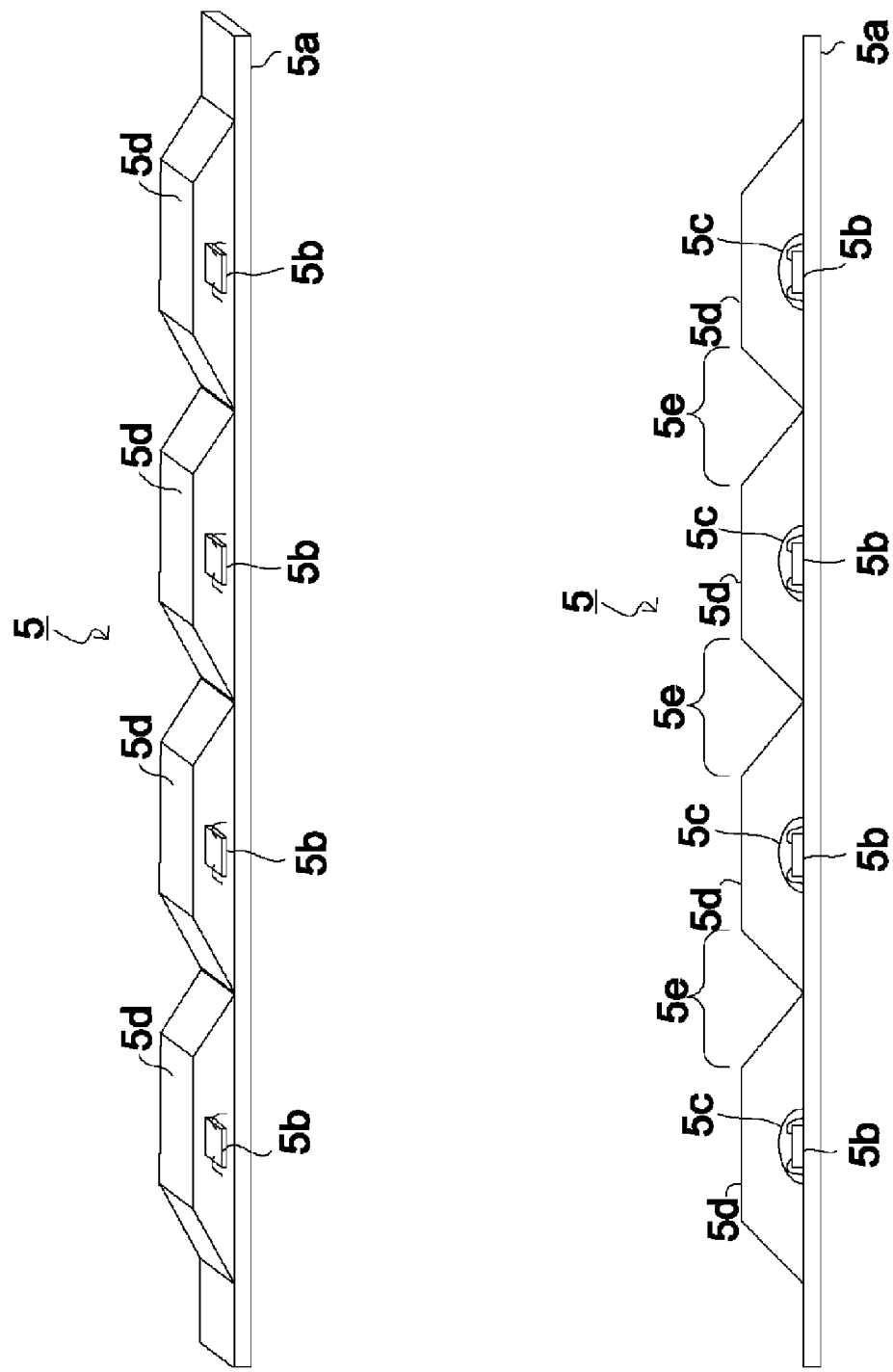
FIG. 3 A perspective view (an upper part) and a longitudinal sectional view (a lower part) of a light source included in the bifacial light emitting backlight according to the first embodiment of the invention.

A detailed description with respect to the light source 5 will now be given with reference to FIG. 3. An upper part in FIG. 3 shows a perspective view of the light source 5, and a lower part in FIG. 3 shows a longitudinal sectional view of the light source 5.

As shown in the diagram, the light source 5 is provided with a printed circuit board 5a, a plurality of LEDs 5b that emit blue light, a transmissive resin sealing layer 5c that contains a fluorescent substance, and a transmissive resin sealing layer 5d that does not contain a fluorescent substance.

The printed circuit board 5a has the shape of a slim rectangle, and has a wiring pattern formed thereon. The LEDs 5b are arranged on the printed circuit board 5a in the longitudinal direction thereof with an interval between one another, and the individual LEDs 5b are connected to the conductor of the printed circuit board 5a with wires so that the LEDs 5b are electrically connected in series. On the printed circuit board 5a, as an end portion of the series circuit, a positive and negative electrode terminals (none of which are illustrated) are formed, and, with a voltage applied between the terminals, the LEDs 5b emit light.

The resin sealing layer 5c is, for example, a silicon resin in which a yellow fluorescent substance is dispersed as a fluorescent substance, and is so formed as to surround each LED 5b. The yellow fluorescent substance excites when it absorbs the blue light emitted by the LED 5b and then emits yellow light, and, with the blue light and the yellow light mixed together, white light is emitted.

The resin sealing layer 5d is formed into a substantially trapezoidal cylinder so as to surround each resin sealing layer 5c, and is formed of for example, silicon resin. A concave part 5e having a substantially V section is formed by faces that correspond to oblique sides connecting the upper side and the lower side of the trapezoid, of the surfaces of adjacent resin sealing layer 5d that are on the opposite side from the printed circuit board 5a side. The concave part 5e is formed between adjacent LEDs 5b.

Light that is emitted from a light source portion composed of the LED 5b and the resin sealing layer 5c and that travels through the resin sealing layer 5d in the longitudinal direction thereof is taken out from the concave part 5e as emitting light, and thus it is possible to enhance the brightness of a part between adjacent LEDs where the brightness tends to be low, and to achieve excellent uniformity in the distribution of the light emission intensity in the longitudinal direction of the light source 5.

Back to the description on the configuration of the backlight 100. The light guide plate 2 is a substantially rectangular member that has side faces, a top face 2a, and a bottom face 2b, the top face 2a and the bottom face 2b being so located as to sandwich the side faces. In addition, the light guide plate 2 is formed of resin such as acrylic. The top face 2a and the bottom face 2b are subjected to mirror-surface finishing. A light incident surface 2c, which is one face of the side faces of the light guide plate 2, faces each resin sealing layer 5d of the light source 5, so that the light emitted from the light source 5 enters the light guide plate 2 through the light incident surface 2c.

The main-side MPA sheet 3 is formed integral with the light guide plate 2. The main-side MPA sheet 3 is a transparent sheet of which one face has a large number of microstructure prisms 3a with the shape of a substantially trapezoid body of revolution formed therein, and has an index of refraction equal to that of the light guide plate 2. A film portion 3b of the main-side MPA sheet 3 has the same size as the top face 2a of the light guide plate 2. With adhesive applied to the entire top face 2a of the light guide plate 2, the individual prisms 3a and a substantially rectangular project portion 3c, which is formed at one end of the film portion 3b, are adhered to the top face 2a. In this way, the main-side MPA sheet 3 is formed integral with the light guide plate 2 so as to cover the entire top face 2a of the light guide plate 2. The index of refraction of the adhesive is equal to that of the light guide plate 2. The light that has entered the light guide plate 2 through the light incident surface 2c of the light guide plate 2 travels through the light guide plate 2 by total reflection, then leaves through the top face 2a for the prisms 3a, then, by being totally reflected at the prisms 3a, changes its travel direction to a direction normal to the top face 2a, and then exits through the film portion 3b toward a main-side liquid crystal panel (unillustrated).

The reflective sheet 6 comprises a sheet-like portion having a substantially rectangular project portion formed at one end thereof. This project portion is placed on the light source 5, and a part of the sheet-like portion is placed on the main-side MPA sheet 3. The project portion has a reflective surface that faces the light source 5, and the part of the sheet-like portion has a reflective surface that faces the light guide plate 2. Thus, the reflective sheet 6 diffuses and reflects the light from the light source 5 and the leakage light from the light guide plate 2 so as to return the light to the light guide plate 2, and thus has functions for enhancing the light use efficiency and for enhancing the uniformity of brightness in a light-emitting region of the backlight.

The reflective sheet 7 is placed on the reflective sheet 9 so as to cover lower parts of the light source 5 and of a light incident part of the light guide plate 2. The reflective sheet 7 has a reflective surface that faces the light guide plate 2. Thus, the reflective sheet 7 diffuses and reflects the light from the light source 5 and the leakage light from the light guide plate 2 so as to return the light to the light guide plate 2, and thus has functions for enhancing the light use efficiency and for enhancing the uniformity of brightness in the light-emitting region of the backlight.

The light-shielding bifacial tape 8, which is so shaped as to surround the circumference of a substantially rectangular opening 8a, has one face thereof adhered to the entire top face of the frame 1, a part of a border portion of the top face of the main-side MPA sheet 3, and the entire top face of the reflective sheet 6. On the other face of the light shielding-bifacial tape 8, the main-side liquid crystal panel (unillustrated) is adhered. A region directly below a region in the opening 8a of the light-shielding bifacial tape 8 is a prism formation region of the main-side MPA sheet 3, and the region in the opening 8a is a light-emitting region, from which light is emitted to illuminate the main-side liquid crystal panel (unillustrated).

The sub-side MPA sheet 4 is formed integral with the light guide plate 2. Like the main-side MPA sheet 3, the sub-side MPA sheet 4 is a transparent sheet of which one face has a large number of microstructure prisms 4a with the shape of a substantially trapezoid body of revolution formed therein, and has an index of refraction equal to that of the light guide plate 2. A film portion 4b of the sub-side MPA sheet 4 has a smaller size than the bottom face 2b of the light guide plate 2. With adhesive applied to a part of the bottom face 2b of the light guide plate 2, the individual prisms 4a and a substantially rectangular project portion 4c, which is formed at one end of the film portion 4b, are adhered to the bottom face 2b. In this way, the sub-side MPA sheet 4 is formed integral with the light guide plate 2 so as to cover a part of the bottom face 2b. The index of refraction of the adhesive is equal to that of the light guide plate 2. The light that has entered the light guide plate 2 through the light incident surface 2c of the light guide plate 2 travels through the light guide plate 2 by total reflection, then leaves through the bottom face 2b for the prisms 4a, then, by being totally reflected at the prisms 4a, changes its travel direction to a direction normal to the bottom face 2b, and then exits through the film portion 4b towards a sub-side liquid crystal panel (unillustrated).

The reflective sheet 9, which has a recess part formed at one end thereof and has a substantially rectangular opening, is arranged below the light source 5 and the light guide plate 2 such that the sub-side MPA sheet 4 is arranged in that opening. In the recess part, the reflective sheet 7 is arranged. A part of the reflective sheet 9 other than the part where the recess part is formed has a reflective surface that faces the light guide plate 2. Thus, the reflective sheet 9 diffuses and reflects the leakage light from the light guide plate 2 so as to return the light to the light guide plate 2, and thus has functions for enhancing the light use efficiency and for enhancing the uniformity of brightness in the light-emitting region of the backlight.

The light-shielding bifacial tape 10, which is so shaped as to surround the circumference of a substantially rectangular opening 10a, has one face thereof adhered to the entire bottom face of the frame 1, the entire top face of the reflective sheet 9, and the entire border portion of the bottom face of the sub-side MPA sheet 4. On the other face of the light-shielding bifacial tape 10, the sub-side liquid crystal panel (unillustrated) is adhered. A region directly above a region in the opening 10a of the light-shielding bifacial tape 10 is a prism formation region of the sub-side MPA sheet 4, and the region in the opening 10a is a light-emitting region, from which light is emitted to illuminate the sub-side liquid crystal panel (unillustrated). The prism formation region of the sub-side MPA sheet 4 is smaller than that of the main-side MPA sheet 3, the light-emitting region on the sub side is also smaller than that on the main side, and the display region of the sub-side liquid crystal panel is smaller than that of the main-side liquid crystal panel.

As seen from the top, the prism formation region of the sub-side MPA sheet 4 is included in the prism formation region of the main-side MPA sheet 3. Prisms in the prism formation region of the main-side MPA sheet 3 are, in an arrangement (FIG. 4) where the density of prisms arranged increases with distance from the light source 5, so arranged that the density of prisms arranged increases in a region (region A in FIG. 2) that faces the prism formation region of the sub-side MPA sheet 4. In the light guide plate 2, the farther the light travels from the light source 5, the more the light energy is consumed, and thus, with a view to achieving uniform brightness in the main-side light-emitting region, the density of prisms arranged in the main-side MPA sheet 3 needs to be increased with distance from the light source 5. However, since the light energy is used in the prism formation region of the sub-side MPA sheet 4, the above-described structured is adopted with a view to compensating for that used amount, and thus to achieving uniform brightness in the main-side light-emitting region.

As described above, with a bifacial light emitting backlight 100 according to the first embodiment of the invention, it is possible: to cope with liquid crystal display devices, in which the size of a display region is different at both faces of a light guide plate, while reducing the number of optical sheets; to offer excellent uniformity of brightness in the light-emitting regions at the both faces; and to offer excellent display quality in display regions at the both faces. Moreover, by use of a light source 5 which offers excellent uniformity in the distribution of light emission intensity in the longitudinal direction, in the main-side light-emitting region, unevenness in brightness in a region on the light incident part side can be reduced.

Figure 5:
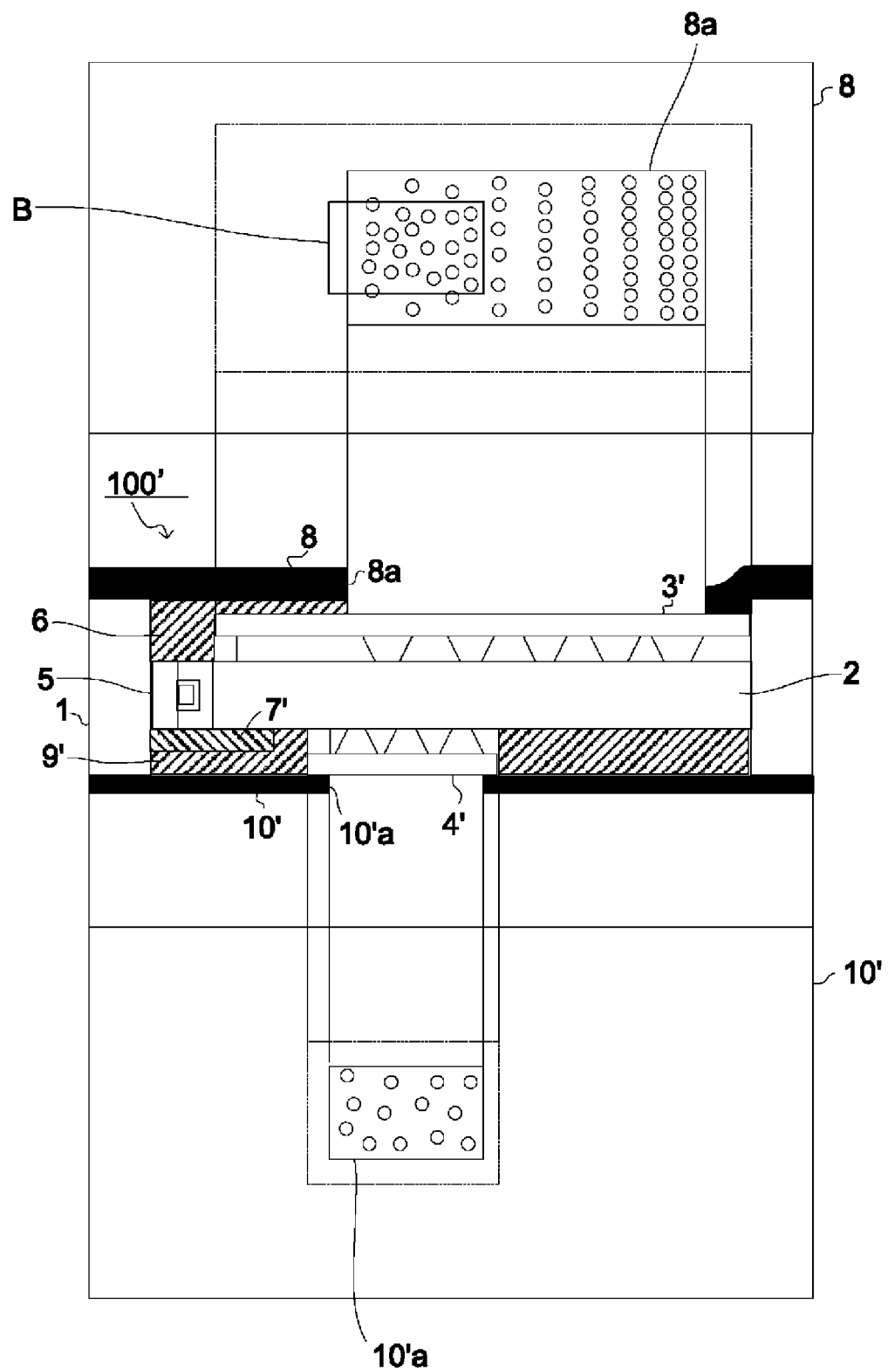
FIG. 5 A side sectional view (a middle part), a top view (an upper part), and a bottom view (a lower part) of a bifacial light emitting backlight according to a modified example of the first embodiment of the invention.

FIG. 5 shows a side sectional view (a middle part), a top view (an upper part), and a bottom view (a lower part) of a bifacial light emitting backlight 100' according to a modified example of the first embodiment. The top and bottom views schematically show the arrangement of prisms in a microprism array sheet. Such components similar to those in the first embodiment are identified by common reference signs.

Compared with the sub-side MPA sheet 4 of the bifacial light emitting backlight 100 according to the first embodiment, a sub-side MPA sheet 4' of the bifacial light emitting backlight 100' according to the modified example of the first embodiment is located closer to the light source 5. Along with this, the density of prisms arranged in the sub-side MPA sheet 4' is made lower than that in the sub-side MPA sheet 4 (comparison between the bottom view in FIG. 5 and the bottom view in FIG. 2) so that the brightness level in the sub-side light-emitting region is adjusted to be equivalent to that in the first embodiment.

As seen from the top, a prism formation region of the sub-side MPA sheet 4' has a part overlapped with a prism formation region of a main-side MPA sheet 3'. Prisms in the prism formation region of the main-side MPA sheet 3' are, in an arrangement (FIG. 4) where the density of prisms arranged increases with distance from the light source 5, so arranged that the density of prisms arranged increases in a region that faces the prism formation region of the sub-side MPA sheet 4' (a region where region B overlaps with the prism formation region of the main-side MPA sheet 3' in FIG. 5). In this way, the uniformity of brightness is achieved in the main-side light-emitting region.

Second Embodiment

Figure 6:
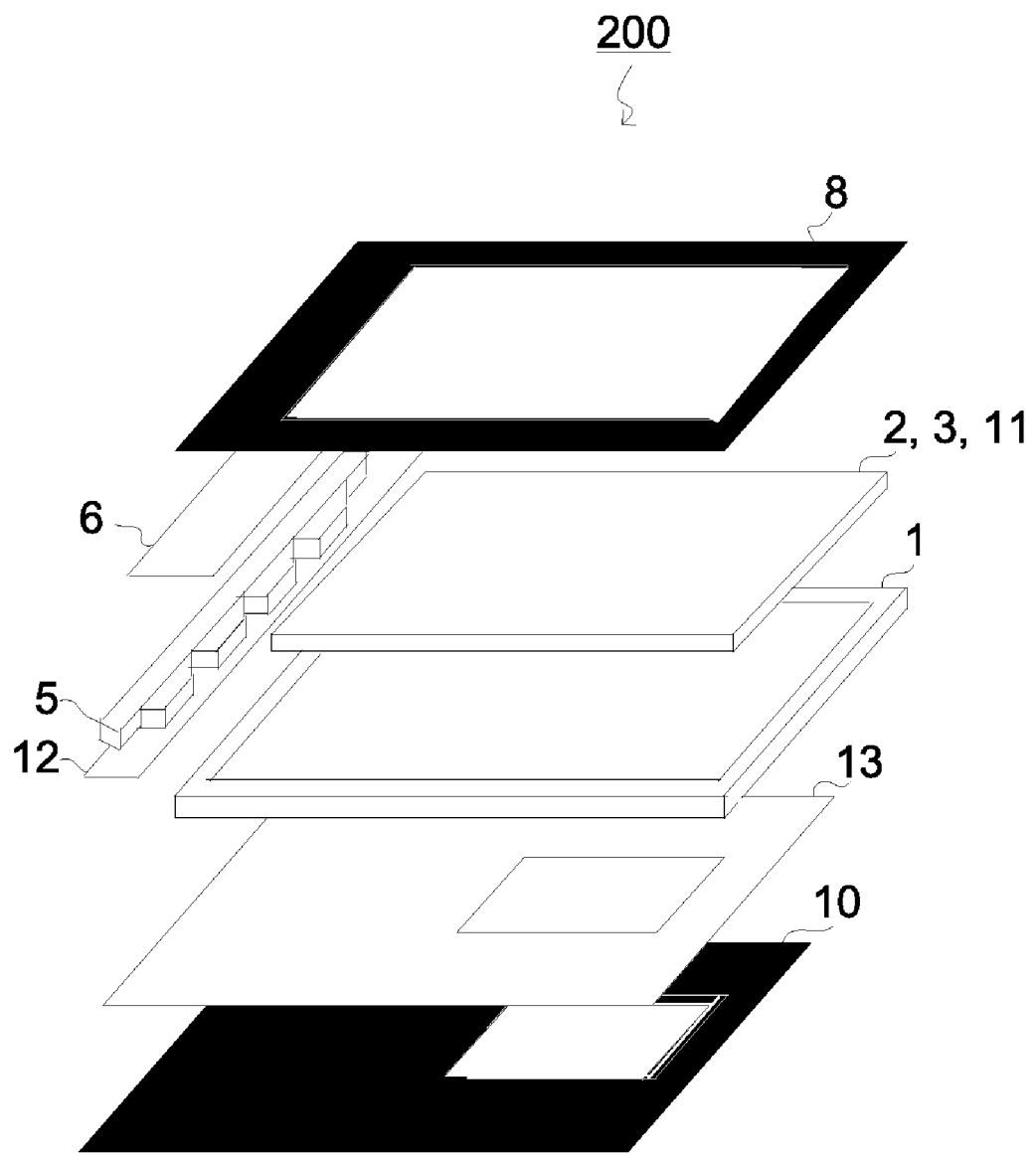
FIG. 6 An exploded perspective view of a bifacial light emitting backlight according to a second embodiment of the invention.

FIG. 6 shows an exploded perspective view of a bifacial light emitting backlight 200 according to a second embodiment of the present invention. In FIG. 6, a light guide plate 2, a main-side microprism array sheet 3, a sub-side microprism array sheet 11 are simply shown as a single rectangular member.

Figure 7:
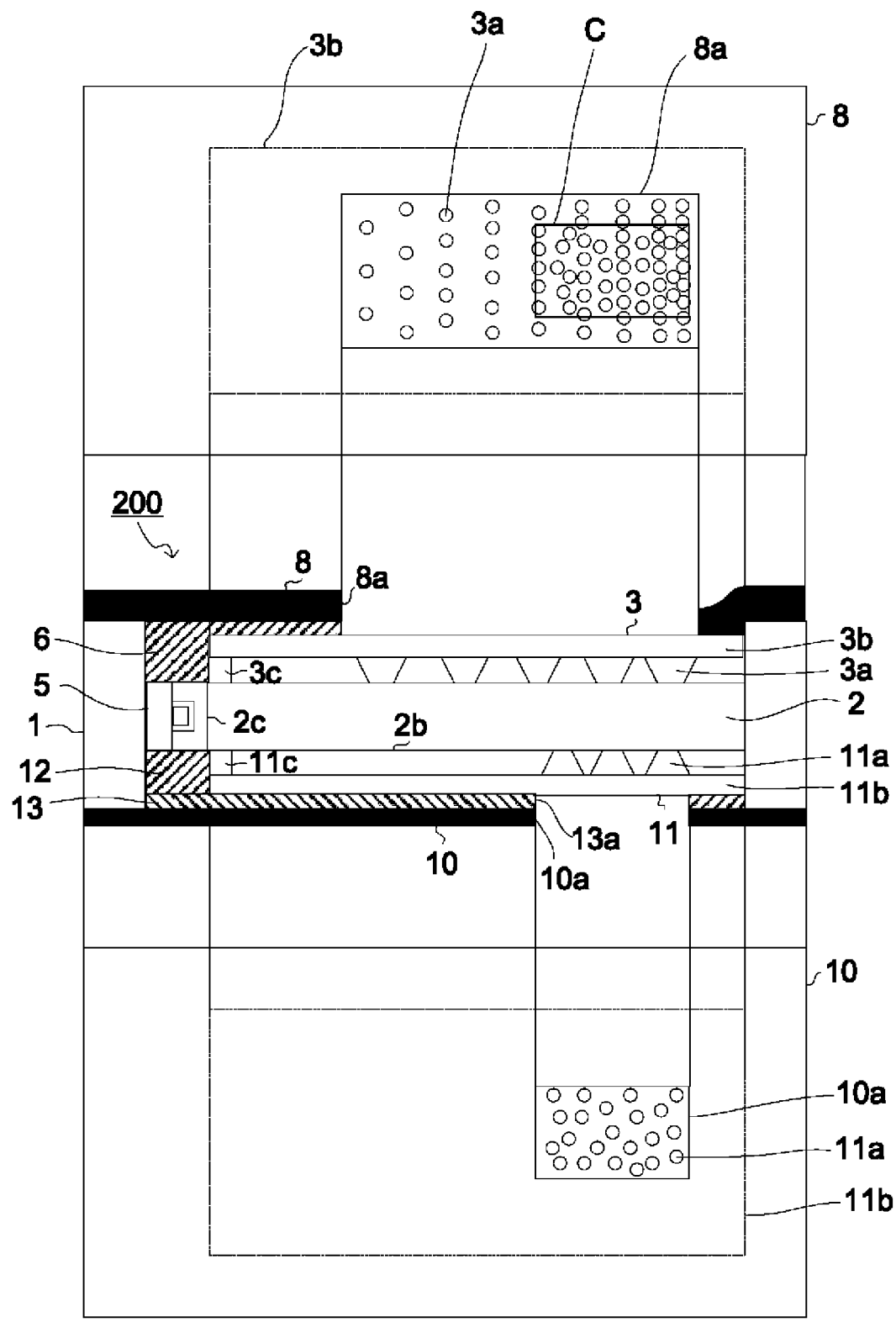
FIG. 7 A side sectional view (a middle part), a top view (an upper part), and a bottom view (a lower part) of the bifacial light emitting backlight according to the second embodiment of the invention.

FIG. 7 shows a side sectional view (a middle part), a top view (an upper part), and a bottom view (a lower part) of the bifacial light emitting backlight 200 according to the second embodiment of the invention. The top and bottom views schematically show the arrangement of prisms in a microprism array sheet.

Such components similar to those in the first embodiment mentioned above in FIGS. 6 and 7 are identified by common reference signs, and no detailed description of them will be repeated.

In the bifacial light emitting backlight 200 according to the second embodiment of the invention, the shape of the sub-side MPA sheet differs from that in the first embodiment. The sub-side MPA sheet 11 is a transparent sheet of which one face has a large number of microstructure prisms 11a with the shape of a substantially trapezoid body of revolution formed therein, and has an index of refraction equal to that of the light guide plate 2. Here, as distinct from the first embodiment, a film portion 11b of the sub-side MPA sheet 11 has the same size as the bottom face 2b of the light guide plate 2. With the adhesive applied to the entire bottom face 2b of the light guide plate 2, the individual prisms 11a and a substantially rectangular project portion 11c formed at one end of the film portion 11b are adhered to the bottom face 2b. In this way, the sub-side MPA sheet 11 is formed integral with the light guide plate 2 so as to cover the entire bottom face 2b. The index of refraction of the adhesive is equal to that of the light guide plate 2. The light that has entered the light guide plate 2 through a light incident surface 2c of the light guide plate 2 travels through the light guide plate 2 by total reflection, then leaves through the bottom face 2b for the prisms 11a, then, by being totally reflected at the prisms 11a, changes its travel direction to a direction normal to the bottom face 2b, and then exits through the film portion 11b toward the sub-side liquid crystal panel (unillustrated).

A reflective sheet 12 is arranged below the light source 5. The reflective sheet 12 has a reflective surface that faces the light source 5. Thus, the reflective sheet 12 diffuses and reflects the light from the light source 5 so as to return the light to the light guide plate 2, and thus has functions for enhancing the light use efficiency and for enhancing the uniformity of brightness in a light-emitting region of the backlight.

A reflective sheet 13 having a substantially rectangular opening 13a is arranged below the reflective sheet 12 and the film portion 11b of the sub-side MPA sheet 11. The reflective sheet 13 has a reflective surface that faces the light guide plate 2. Thus, the reflective sheet 13 diffuses and reflects the leakage light from the light guide plate 2 so as to return the light to the light guide plate 2, and thus has functions for enhancing the light use efficiency and for enhancing the uniformity of brightness in the light-emitting region of the backlight.

The light-shielding bifacial tape 10, which is so shaped as to surround the circumference of a substantially rectangular opening 10a having the same size as the opening 13a of the reflective sheet 13, has one face thereof adhered to the entire bottom face of the frame 1 and the entire bottom face of the reflective sheet 13. In this adhesion state, the opening 13a coincides with the opening 10a to form a single opening. On the other face of the light-shielding bifacial tape 10, the sub-side liquid crystal panel (unillustrated) is adhered. A region directly above a region in the opening so formed as described above is a prism formation region of the sub-side MPA sheet 11, and this region in the opening is a light-emitting region, from which light is emitted to illuminate the sub-side liquid crystal panel (unillustrated). The prism formation region of the sub-side MPA sheet 11 is smaller than the prism formation region of the main-side MPA sheet 3, the light-emitting region on the sub side is also smaller than that on the main side, and a display region of the sub-side liquid crystal panel is smaller than that of the main-side liquid crystal panel.

As seen from the top, the prism formation region of the sub-side MPA sheet 11 is included in the prism formation region of the main-side MPA sheet 3. Prisms in the prism formation region of the main-side MPA sheet 3 are, in the arrangement (FIG. 4) where the density of prisms arranged increases with distance from the light source 5, so arranged that the density of prisms arranged increases in a region that faces the prism formation region of the sub-side MPA sheet 11 (region C in FIG. 7). In this way, the uniformity of brightness is achieved in the main-side light-emitting region.

As described above, also with a bifacial light emitting backlight 200 according to the second embodiment of the invention, it is possible: to cope with liquid crystal display devices, in which the size of a display region is different at both faces of a light guide plate, while reducing the number of optical sheets; to offer excellent uniformity of brightness in the light-emitting regions at the both faces; and to offer excellent display quality in the display regions at the both faces. Moreover, by use of a light source 5 which offers excellent uniformity in the distribution of light emission intensity in the longitudinal direction, in the main-side light-emitting region, unevenness in brightness in a region on the light incident part side can be reduced.

Since the film portion 11b of the sub-side MPA sheet 11 has the same size as the bottom face 2b of the light guide plate 2, the sub-side MPA sheet 11 can be adhered to the light guide plate 2 easily with no deviation. From a viewpoint of no waste in sheets and reduction in the cost of sheets, the sub-side MPA sheet 4 used in the first embodiment is desirable.

Figure 8:
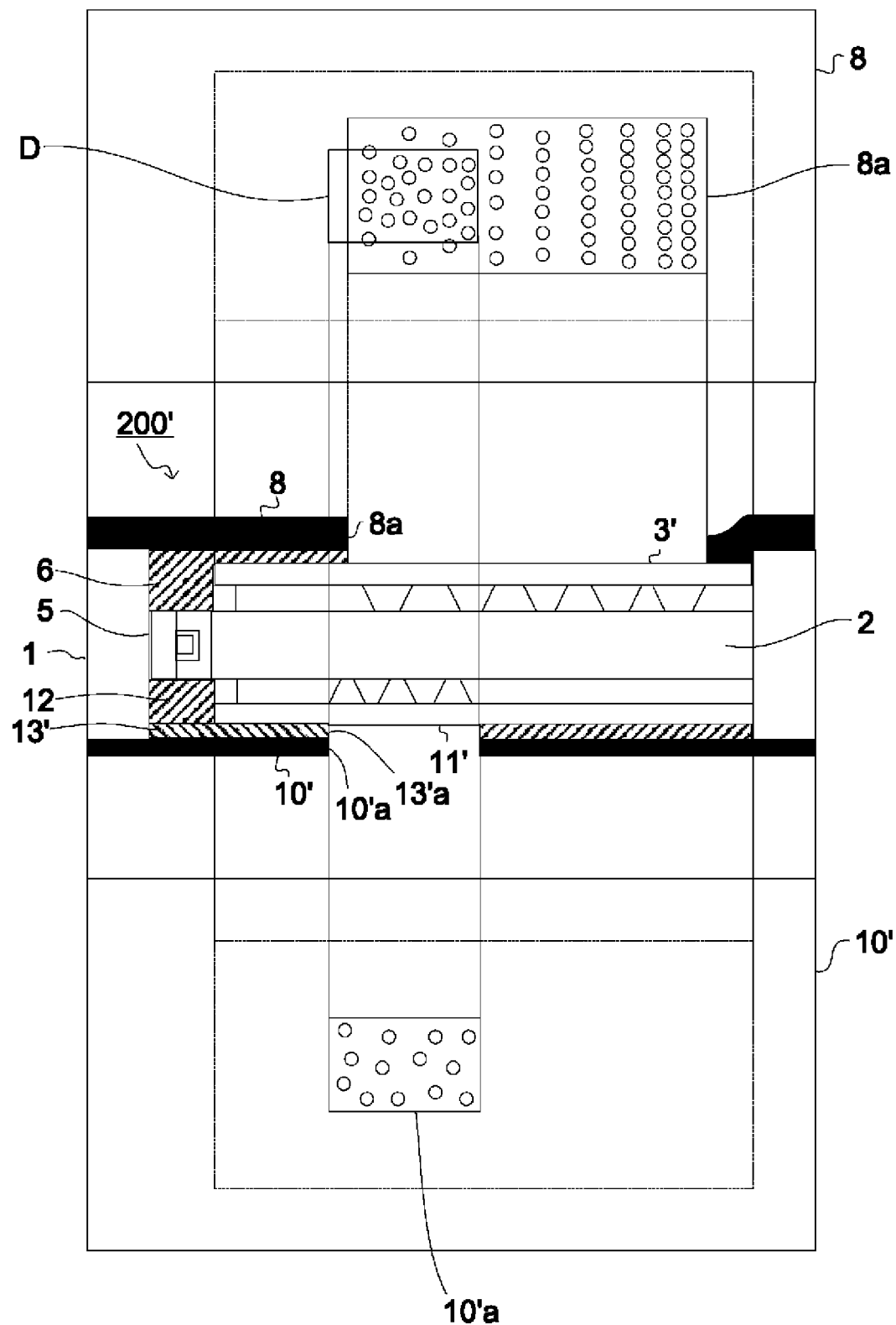
FIG. 8 A side sectional view (a middle part), a top view (an upper part), and a bottom view (a lower part) of a bifacial light emitting backlight according to a modified example of the second embodiment of the invention.

FIG. 8 shows a side sectional view (a middle part), a top view (an upper part), and a bottom view (a lower part) of a bifacial light emitting backlight 200' according to a modified example of the second embodiment. The top and bottom views schematically show the arrangement of prisms in a microprism array sheet. Such components similar to those of the second embodiment are identified by common reference signs.

Compared with the prism formation region of the sub-side MPA sheet 11 of the bifacial light emitting backlight 200 according to the second embodiment, a prism formation region of a sub-side MPA sheet 11' of the bifacial light emitting backlight 200' according to the modified example of the second embodiment is located closer to the light source 5. Along with this, the density of prisms arranged in the sub-side MPA sheet 11' is made lower than that in the sub-side MPA sheet 11 (comparison between the bottom view in FIG. 8 and the bottom view in FIG. 7), so that the brightness level in the sub-side light-emitting region is adjusted to be equivalent to that in the second embodiment.

As seen from the top, the prism formation region of the sub-side MPA sheet 11' has a part thereof overlapped with the prism formation region of the main-side MPA sheet 3'. Prisms in the prism formation region of the main-side MPA sheet 3' are, in the arrangement (FIG. 4) where the density of prisms arranged increases with distance from the light source 5, so arranged that the density of prisms arranged increases in a region that faces the prism formation region of the sub-side MPA sheet 11' (a region where region D overlaps with the prism formation region of the main-side MPA sheet 3' in FIG. 8). In this way, the uniformity of brightness is achieved in the main-side light-emitting region.

INDUSTRIAL APPLICABILITY

The bifacial light emitting backlight according to the present invention can be used by assembling it into liquid crystal display devices.

The invention claimed is:

1. A bifacial light emitting backlight comprising:
   a light source comprising a base member that extends in a longitudinal direction and a plurality of LEDs that are arranged on a surface of the base member in a longitudinal direction thereof with an interval between one another;
   a light guide plate having light from the light source incident on an end face thereof, the light guide plate having a top face and a bottom face opposite to the top face;
   a first microprism array sheet which is a transparent sheet having a plurality of microstructure prisms formed in one face thereof, with the prisms facing the top face of the light guide plate and receiving light from the top face of the light guide plate and directing the light to a first liquid crystal panel; and
   a second microprism array sheet which is a transparent sheet having a plurality of microstructure prisms formed in one face thereof, with the prisms of the second microprism array sheet facing the bottom face of the light guide plate and receiving light from the bottom face of the light guide plate and directing the light to a second liquid crystal panel,
   wherein
   the first microprism array sheet is disposed adjacent to and above the light guide plate and the second microprism array sheet is disposed adjacent to and below the light guide plate,
   a prism formation region of the second microprism array sheet is smaller than a prism formation region of the first microprism array sheet, and
   prisms in the prism formation region of the first microprism array sheet are, in an arrangement where a density of prisms arranged increases with distance from the light source, so arranged that the density of prisms arranged increases in a region that faces the prism formation region of the second microprism array sheet,
   wherein the first and second microprism array sheets are respectively attached to the top and bottom faces of the light guide plate.

2. The bifacial light emitting backlight according to claim 1,
   wherein the light source comprises a resin portion so arranged as to cover the plurality of LEDs, and a surface of the resin portion on an opposite side from said base member side has, in the longitudinal direction, a concave part between adjacent ones of the LEDs in the longitudinal direction.

3. The bifacial light emitting backlight according to claim 1,
   wherein a film portion included in the second microprism array sheet has a smaller size than a face of the light guide plate, on which the second microprism array sheet is provided.

4. The bifacial light emitting backlight according to claim 1, wherein the film portion included in the second microprism array sheet has the same size as the face of the light guide plate, on which the second microprism array sheet is provided.

5. The bifacial light emitting backlight according to claim 2, wherein a film portion included in the second microprism array sheet has a smaller size than a face of the light guide plate, on which the second microprism array sheet is provided.

6. The bifacial light emitting backlight according to claim 2 wherein the film portion included in the second microprism array sheet has the same size as the face of the light guide plate, on which the second microprism array sheet is provided.

7. The bifacial light emitting backlight according to claim 1, wherein the attachment of the first and second microprism array sheet to the light guide plate includes an adhesive material bonding the first and second microprism array sheets to the light guide plate, wherein the adhesive has an index of refraction equal to that of the light guide plate, the first microprism array sheet, and the second microprism array sheet.

8. The bifacial light emitting backlight according to claim 1, wherein the first and second microprism array sheets have an index of refraction equal to an index of refraction for the light guide plate.

* * * * *